Jan. 31, 1933.  C. H. WILL  1,895,503
HEATING APPARATUS FOR AUTOMOTIVE VEHICLES
Filed Jan. 16, 1930    2 Sheets-Sheet 2

INVENTOR
CARL H. WILL
ATTORNEYS

Patented Jan. 31, 1933

1,895,503

UNITED STATES PATENT OFFICE

CARL H. WILL, OF MINNEAPOLIS, MINNESOTA, ASSIGNOR TO TROPIC-AIRE, INCORPORATED, OF MINNEAPOLIS, MINNESOTA, A CORPORATION OF DELAWARE

HEATING APPARATUS FOR AUTOMOTIVE VEHICLES

Application filed January 16, 1930. Serial No. 421,184.

This invention relates to an automotive vehicle heater, and the general object of the invention is to provide a heating apparatus for automotive vehicles which will present certain improvements over the reissue patent to Caesar, No. 17,131 granted November 13, 1928.

A more specific object is to provide a heating apparatus which will include a heating element adapted to be inserted within the body of an automotive vehicle, and means for supplying oil to said heating element as a heating medium therefor.

A further specific object is to provide a heating apparatus which will include a heating element adapted to be inserted within the body of an automotive vehicle, and novel and improved mechanism for causing a circulation of heated oil of a lubricating system of the vehicle, as, for example, the crank case oil, through said heating element as a heating medium therefor.

A still further specific object is to provide a heating apparatus as above stated, which will additionally include means for causing a continuous circulation of air through the heating element adapted to absorb heat from the heated oil therein, to thus provide a continuous circulation of heated air within the automotive vehicle body.

And a still further object is to provide a heating apparatus which will include a heating element adapted to be inserted within the body of an automotive vehicle, connections for providing a circulation of heated oil of a lubricating system of the vehicle engine through the heating element as a heating medium therefor, and an auxiliary heater for the oil in one of said connections adapted to be associated with the exhaust manifold, or other heated member, of the vehicle engine to absorb heat from exhaust gases in said exhaust manifold, or from said other heated member, as the case may be, and to give up the heat absorbed to the oil, desirably during the passage of the oil from said lubricating system to the heating element.

With the above objects in view, as well as others which will appear as the specification proceeds, the invention comprises the construction, arrangement and combination of parts as now to be fully described, it being understood that the disclosure herein is merely illustrative and meant in no way in a limiting sense, changes in details of construction and arrangement of parts being permissible so long as within the spirit of the invention and the scope of the claims which follow.

In the accompanying drawings forming a part of this specification.

Figure 1:
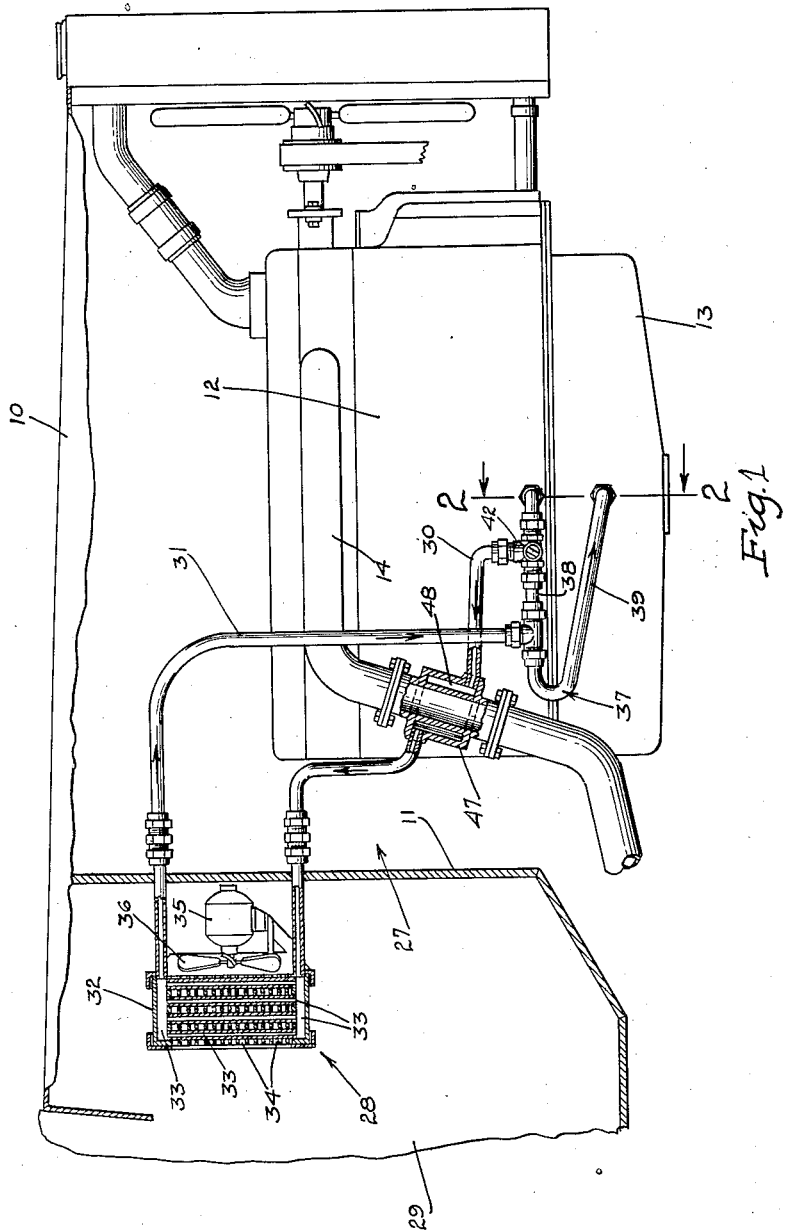
Fig. 1 is an elevational view, partially sectioned, of a heating apparatus in which the features of the invention are incorporated, the present view also disclosing a fragment of an automotive vehicle, including parts of the vehicle with which the heating apparatus is associated.

With respect to the drawings and the numerals of reference thereon, 10 represents a fragment of an automotive vehicle, 11 the dash of said vehicle, and 12 indicates the vehicle engine including a crank case 13 and an exhaust manifold 14.

Numeral 15 represents lubricating oil in the crank case, 16 indicates a pump within the oil of said crank case, and 17 denotes the pump outlet leading to parts of the engine or vehicle to be lubricated. The pump 16 may be of any ordinary or preferred construction heretofore known. As shown, the pump is conveniently driven from a shaft 18 receiving its power from any suitable movable part of the automotive vehicle. The pump casing 19 is shown as situated below a perforated diaphragm 20 of ordinary construction, and an upper portion of said casing lies in an opening 21 of said diaphragm 20. The pump outlet includes a port through the pump casing and above the pumping gears 22, and also includes a pipe 23 attached to the upper portion of the pump casing, as at 24, and having its upper end secured, as at 25, to a gear housing 26 within or above the crank case, the gear housing including an outlet port leading to parts to be lubricated and in communication with the port in the pipe 23 to receive oil therefrom, the direction in which the oil is pumped being disclosed by the arrows in Fig. 2. It is to be understood that the oil forced through the pump outlet 17 to parts to be lubricated eventually returns by gravity to the bottom of the crank case, save the parts of the oil which are utilized for lubricating purposes.

The heating apparatus of the invention is represented generally at 27. As disclosed, the heating apparatus includes a heating element 28 within the vehicle body 29, a connection 30 leading from the pump outlet 17 to the heating element, and a connection 31 leading from the heating element back to the crank case.

More specifically, the heating element may consist of a casing 32 including oil chambers and passages 33 with which the connections 30 and 31 communicate, and air passages 34 traversing the casing 32 and the oil chamber and passages 33. Numeral 35 designates a motor suitably mounted upon or in fixed relation to the casing 32, and 36 represents a fan upon the motor shaft and situated adjacent the air passages 34, the fan being for the purpose of causing air to be forcibly circulated through the air passages in about the manner as described in the Caesar reissue patent above identified to thus become heated and heat the interior of the vehicle body.

The adjacent portions of each of the connections 30 and 31 may be secured to the casing of the heating element in any preferred manner. As disclosed, each connection 30, 31 has snug passage through the dash 11 in such manner that exhaust gases below the hood may not pass to the interior of the vehicle body.

Figure 2:
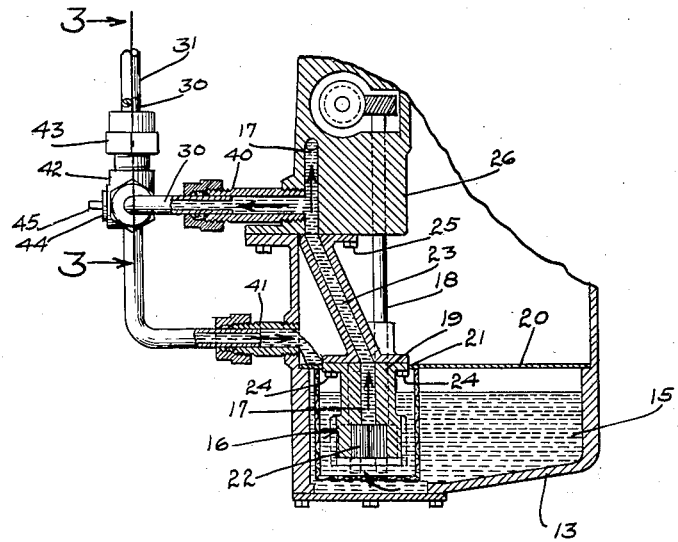
Fig. 2 is a detail sectional view of a part of the heating apparatus, taken on line 2—2 in Fig. 1.

The connections 30 and 31 are associated with the pump outlet 17 and the crank case 13, respectively, in the manner now to be described. A generally V-shaped member, 37, is situated outside of the crank case in the manner disclosed in Fig. 1. This member 37 has the free end of one of its legs, the upper leg 38 as shown, attached to the gear housing 26, as by a suitable coupling 40, to communicate with the pump outlet 17, and has the free end of its other leg, the lower leg 39 as shown, attached to the crank case 13 as by a suitable coupling 41, to communicate with the interior of said crank case, communication of said lower leg 39 of the V-shaped connecting pipe with said crank case desirably being located just above the diaphragm 20, about as shown in Fig. 2.

A fitting 42 suitably arranged in the upper leg 38 of the V-shaped connecting pipe 37 receives a suitable coupling 43 attaching the adjacent end of the connection 30 to said upper leg 38. The coupling 42 includes a three-way valve 44 having an operating piece 45. A fitting 46 suitably connected in said upper leg 38, between the coupling 42 and the angle end of the V-shaped connecting pipe, receives the connection 31. All of the joints for the couplings and fittings described, and between the connections 30 and 31 and the V-shaped connecting pipe are of course made to be oil tight.

Figure 3:
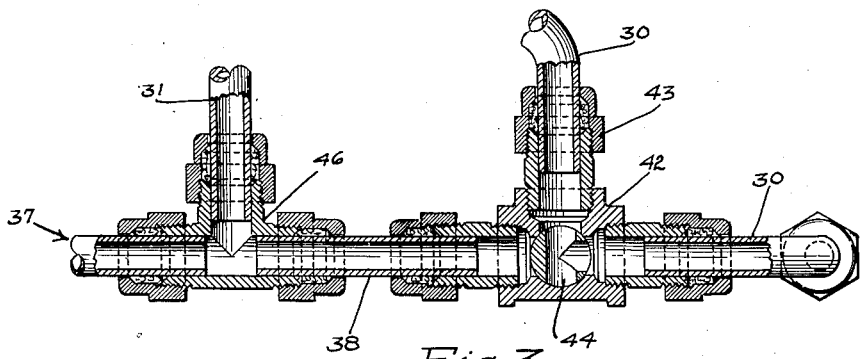
Fig. 3 is a detail sectional view taken on line 3—3 in Fig. 2.

The three-way valve 44 is adapted to be manipulated to the position disclosed in Fig. 3 to thus shut off oil communication between the part of the upper leg 38 at the right of the fitting 42 in said Fig. 3 and the part of said upper leg at the left of said fitting, to thus cause oil forced by the pump 16 through the pump outlet 17 and into the adjacent end of the upper leg 38 of the V-shaped connecting pipe to travel from the fitting 42 directly into the connection 30, and thence to the oil chambers and passages 33 of the heating element. The oil returns from the heating element under the pressure of the pump 16 through the connection 31 to the fitting 46, and thence flows from said fitting 46 to and through the lower leg 39 of the connecting pipe and back to the crank case, the flow of oil through the connection 31 and through the lower leg 39 being aided by gravity. When it is desired to stop flow of oil through the heating element, the three-way valve 44 is manipulated, as by the operating piece 45, to cut off communication between the upper leg 38 of the connecting pipe 37 and the connection 30, and to at the same time provide open passage for the oil through the full length of said upper leg 38. With the connection 30 closed to the passage of oil from said upper leg 38, and the full length of said leg open to the passage of oil, the oil forced by the pump 16 which would otherwise travel through the heating element will pass from said upper leg 38 to the lower leg 39 of the connecting pipe by way of the angle in said pipe and back to the crank case, as will be obvious.

The connection 30 leading from the pump outlet 17 to the heating element may include an auxiliary heater 47 of any desired and suitable construction associated with the exhaust manifold 14, or with some other heated member, of the vehicle engine, to absorb heat from exhaust gases in said exhaust manifold, or from said other heat containing member, and to give up the heat absorbed to the oil during its passage from the crank case 13 to the heating element 28. As shown, the auxiliary heater 47 consists of a cylindrical member inserted in the exhaust pipe of the vehicle engine, and including a double wall providing an annular chamber 48 about the exhaust pipe with which conduits constituting the connection 30 communicate, it being understood that the oil which passes through the connection 30, travels through the annular chamber 48, and thus becomes heated. An auxiliary heater of variant type, either surrounding the exhaust manifold or exhaust pipe, or entering said exhaust manifold or exhaust pipe, can be substituted for the auxiliary heater disclosed, or the auxiliary heater can be omitted altogether should this be deemed desirable.

It will be apparent that oil passing through the chambers and passages 33 of the heating element will cause the air-passages 34 to be heated, and that the fan 36 will cause a continuous circulation of air through said air passages to absorb heat from the heated oil and thus provide a continuous circulation of heated air throughout the automotive vehicle body. The absorption of heat from the oil in the heating element will permit this oil to be returned through the connection 31 and the V-shaped connecting pipe 37 to the crank case, or other part of the vehicle, in a cooled state, even though the oil may have been heated to a relatively high temperature upon its passage through the auxiliary heater 47 to the heating element.

When the passage of heated oil to the heating element is prevented by closing communication between the V-shaped connecting pipe 37 and the connection 30, the fan 36 can be operated to cause a circulation of air within the vehicle body without heating said air.

I claim as my invention:

1. A heating apparatus for automotive vehicles having a body and an engine provided with a lubricating system, comprising a heating element located within said body, and means for supplying heated oil from said lubricating system to said heating element.

2. A heating apparatus for automotive vehicles having a body and an engine provided with a lubricating system, comprising a heating element located within said body, and means for circulating heated oil from said lubricating system through said heating element.

3. A heating apparatus for automotive vehicles having a body and an engine provided with a crank case lubricating system, comprising a heating element located within said body, and means for circulating heated oil from said crank case lubricating system through said heating element.

4. A heating apparatus for automotive vehicles having a body and an engine provided with a crank case lubricating system, comprising a heating element located within said body, means for supplying heated oil from said crank case lubricating system to said heating element, and means for forcibly circulating air through said heating element.

5. A heating apparatus for automotive vehicles having a body and an engine provided with a lubricating system, comprising a heating element located within said body, connections between said heating element and said lubricating system, and means for circulating heated oil from said lubricating system through said connections and said heating element.

6. A heating apparatus for automotive vehicles having a body and an engine provided with a lubricating system, comprising a heating element, connections between said heating element and said lubricating system, means for circulating heated oil from said lubricating system through said connections and said heating element, and means associated with one of said connections for imparting additional heat to said lubricating oil.

7. A heating apparatus for automotive vehicles having a body and an engine provided with a lubricating system and an exhaust manifold, comprising a heating element, connections between said heating element and said lubricating system, means for circulating heated oil from said lubricating system through said connections and said heating element, and means associated with one of said connections and surrounding said exhaust manifold for imparting additional heat to said lubricating oil.

8. A heating apparatus for automotive vehicles having a body and an engine provided with a crank case lubricating system, comprising a heating element, connections between said heating element and said crank case lubricating system, and means for forcing heated oil to continuously flow from said lubricating system through said connections and said heating element.

In witness whereof, I have hereunto set my hand this 14th day of January, 1930.

CARL H. WILL.